US012348393B2

(12) United States Patent
Binder et al.

(10) Patent No.: US 12,348,393 B2
(45) Date of Patent: *Jul. 1, 2025

(54) METHODS FOR MANAGING INSERTION OF METADATA INTO A DATA STREAM TO ASSIST WITH ANALYSIS OF NETWORK TRAFFIC AND DEVICES THEREOF

(71) Applicant: F5, Inc., Seattle, WA (US)

(72) Inventors: Peter Binder, Seattle, WA (US); Vutrala Narayana, Seattle, WA (US); Saxon Amdahl, San Jose, CA (US); Pete Thornewell, Seattle, WA (US)

(73) Assignee: F5, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/410,498

(22) Filed: Jan. 11, 2024

(65) Prior Publication Data

US 2024/0146628 A1    May 2, 2024

Related U.S. Application Data

(63) Continuation of application No. 16/931,918, filed on Jul. 17, 2020, now Pat. No. 11,909,609.

(60) Provisional application No. 62/875,349, filed on Jul. 17, 2019.

(51) Int. Cl.
*G06F 15/16*     (2006.01)
*H04L 43/062*    (2022.01)
*H04L 67/561*    (2022.01)

(52) U.S. Cl.
CPC ......... *H04L 43/062* (2013.01); *H04L 67/561* (2022.05)

(58) Field of Classification Search
CPC .. H04L 43/062; H04L 67/2804; H04L 67/561
USPC .................. 709/202–203; 370/252–253, 241
See application file for complete search history.

(56) References Cited

U.S. PATENT DOCUMENTS

| | | | |
|---|---|---|---|
| 10,999,366 B2* | 5/2021 | Gafni | H04L 43/062 |
| 11,451,473 B2* | 9/2022 | Esposito | H04L 43/026 |
| 11,570,244 B2* | 1/2023 | Dawani | H04L 43/028 |
| 11,900,024 B1* | 2/2024 | Volpe | H04L 49/3063 |
| 11,909,609 B1* | 2/2024 | Binder | H04L 43/50 |
| 2012/0008505 A1* | 1/2012 | LaVigne | H04L 12/4633 370/241 |

* cited by examiner

*Primary Examiner* — Bharat Barot
(74) *Attorney, Agent, or Firm* — Troutman Pepper Locke LLP

(57) ABSTRACT

Methods, non-transitory computer readable media, network traffic manager apparatuses, and systems includes receiving a plurality of network packets. Metadata comprising state information for the received plurality of network packets is generated. The generated metadata is inserted into the received plurality of network packets or a cloned version of the plurality of network packets. A network diagnostic operation is performed on the received plurality of network packets based on the inserted metadata into the received plurality of network packets or the cloned version of the plurality of network packets.

20 Claims, 15 Drawing Sheets

METHODS FOR MANAGING INSERTION OF METADATA INTO A DATA STREAM TO ASSIST WITH ANALYSIS OF NETWORK TRAFFIC AND DEVICES THEREOF

This application is a Continuation of U.S. patent application Ser. No. 16/931,918, filed Jul. 17, 2020, the benefit of which is claimed at least under 35 U.S.C. § 120, which further claims the benefit of U.S. Provisional Patent Application Ser. No. 62/875,349, filed Jul. 17, 2019, which both are hereby incorporated by reference in their entirety.

FIELD

This technology generally relates to methods and devices for network traffic management and, more particularly, to methods for managing insertion of metadata into a data stream for network traffic management and devices thereof.

BACKGROUND

Network traffic management generally requires a proxy device to analyze flow of the network packets in a network traffic. This analysis of the network traffic involves collecting and analyzing the session information including the status and actions that are taken on the network packets by the proxy device. Using the collected session information, problems related to misbehavior of the hosts, suspicious user activity, or bot attacks can be reduced, if not prevented. Accordingly, collecting and analyzing this session information associated with the network packets is critical for effective network traffic management.

As a result, prior proxy devices have followed this practice of receiving network packets, analyzing the session information in the received network packets, and then determining a network action based on the analysis. Unfortunately, executing these steps on all of the network packets often leads to an undesirable delay in the network packets reaching the destination and as a result provides a suboptimal performance to the end user. Additionally, the failure of these prior proxy devices from storing previously made decisions on the network packets adds further unnecessary delays when, for example, a network packet that was previously analyzed is routed back again to the prior proxy device.

SUMMARY

A method for managing insertion of metadata into a data stream includes receiving a plurality of network packets. Metadata comprising state information for the received plurality of network packets is generated. The generated metadata is inserted into the received plurality of network packets or a cloned version of the plurality of network packets. A network diagnostic operation is performed on the received plurality of network packets based on the inserted metadata into the received plurality of network packets or the cloned version of the plurality of network packets.

A non-transitory computer readable medium having stored thereon instructions for managing insertion of metadata into a data stream comprising machine executable code which when executed by at least one processor, causes the processor to receive a plurality of network packets. Metadata comprising state information for the received plurality of network packets is generated. The generated metadata is inserted into the received plurality of network packets or a cloned version of the plurality of network packets. A network diagnostic operation is performed on the received plurality of network packets based on the inserted metadata into the received plurality of network packets or the cloned version of the plurality of network packets.

A network traffic management apparatus including at least one of configurable hardware logic configured to be capable of implementing or a processor coupled to a memory and configured to receive a plurality of network packets. Metadata comprising state information for the received plurality of network packets is generated. The generated metadata is inserted into the received plurality of network packets or a cloned version of the plurality of network packets. A network diagnostic operation is performed on the received plurality of network packets based on the inserted metadata into the received plurality of network packets or the cloned version of the plurality of network packets.

A network traffic management system, comprising one or more traffic management apparatuses, client devices, or server devices, the network traffic management system comprising memory comprising programmed instructions stored thereon and one or more processors configured to be capable of executing the stored programmed instructions to receive a plurality of network packets. Metadata comprising state information for the received plurality of network packets is generated. The generated metadata is inserted into the received plurality of network packets or a cloned version of the plurality of network packets. A network diagnostic operation is performed on the received plurality of network packets based on the inserted metadata into the received plurality of network packets or the cloned version of the plurality of network packets.

This technology provides a number of advantages including providing methods, non-transitory computer readable media, apparatuses, and systems that assist with managing insertion of diagnostic metadata into a data stream for network traffic management. In examples of the disclosed technology, metadata can be added to the cloned network packets or pseudo-packets can be inserted into the data stream to provide information on the status or actions taken by the network traffic manager apparatus. By using the diagnostic metadata in the cloned network packets or pseudo-packets, the disclosed technology is able to more effectively and efficiently transfer the received network packets to the destination with less delay.

DETAILED DESCRIPTION

Figure 1:
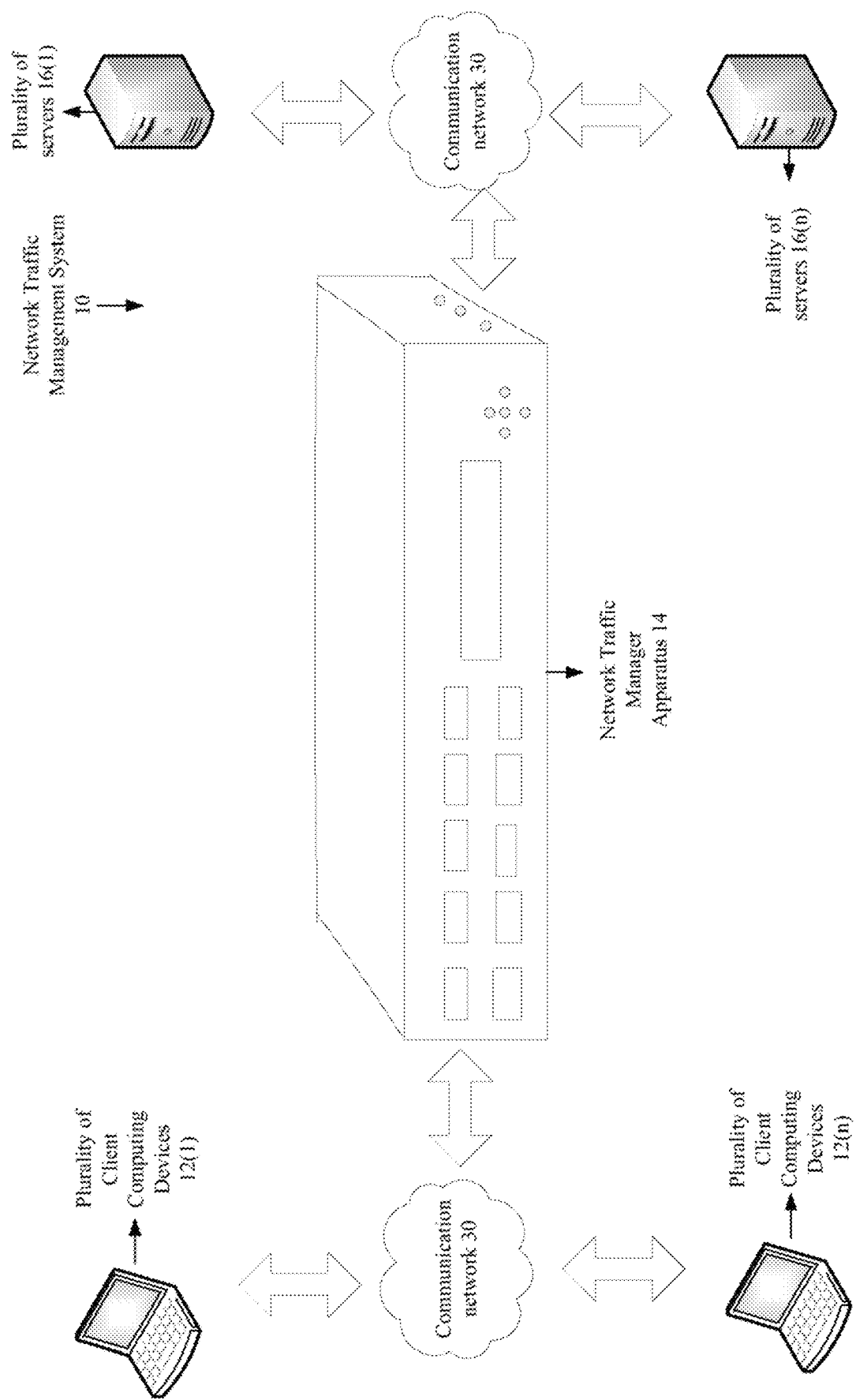
FIG. 1 is an example of a block diagram of a network traffic management system including a network traffic manager apparatus for inserting metadata into a data stream.
Figure 2:
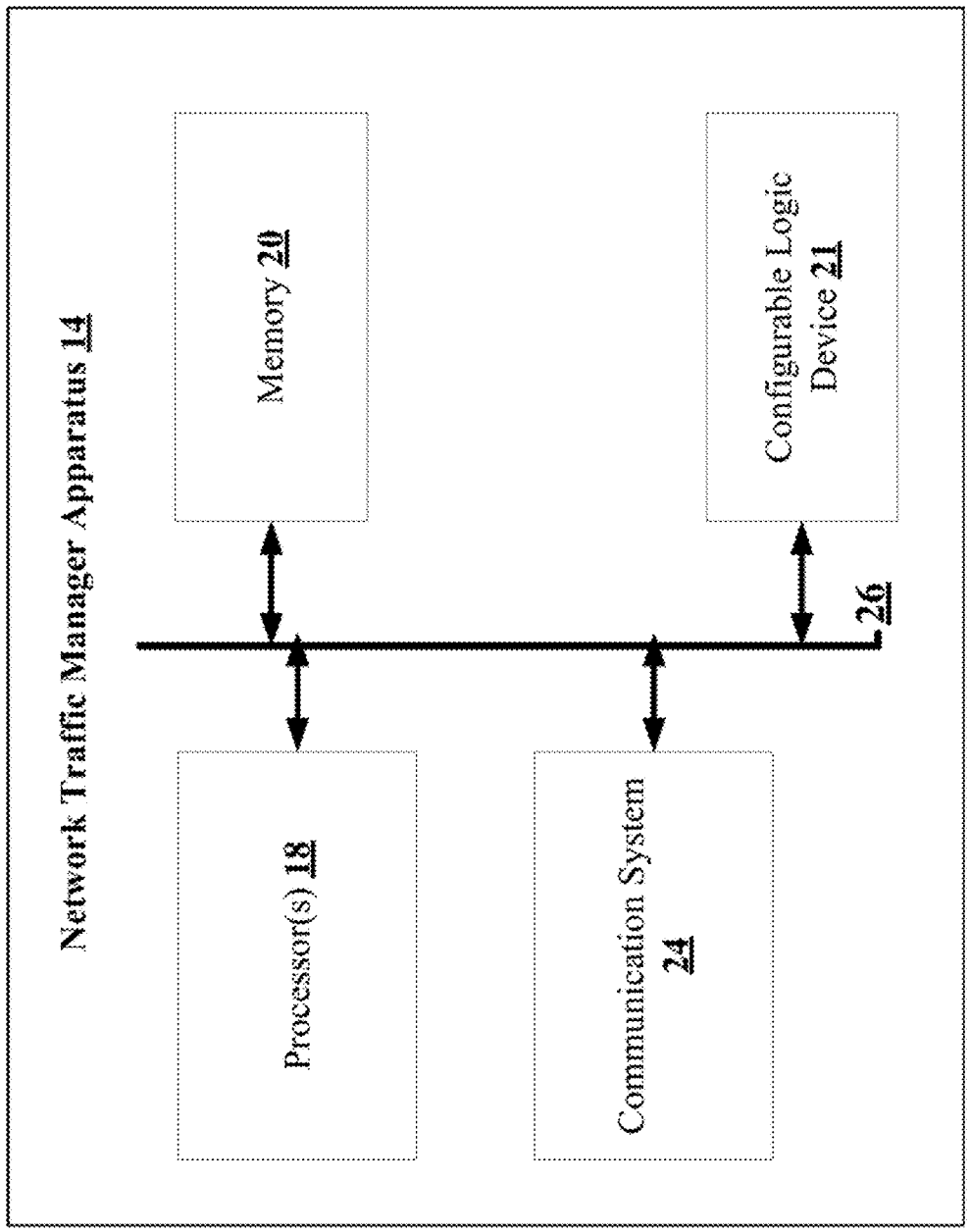
FIG. 2 is an example of a block diagram of a network traffic management apparatus.

An example of a network environment 10 which incorporates a network traffic management system for managing insertion of metadata into a data stream to assist with analysis of network traffic with the network traffic manager apparatus 14 is illustrated in FIGS. 1 and 2. The exemplary environment 10 includes a plurality of client computing devices 12(1)-12(n), a network traffic manager apparatus 14, and a plurality of servers 16(1)-16(n) which are coupled together by communication networks 30, although the environment can include other types and numbers of systems, devices, components, and/or elements and in other topologies and deployments. While not shown, the exemplary environment 10 may include additional network components, such as routers, switches and other devices, which are well known to those of ordinary skill in the art and thus will not be described here. This technology provides a number of advantages including providing methods, non-transitory computer readable media, and devices that manages insertion of metadata into a data stream to assist with analysis of network traffic.

Referring more specifically to FIGS. 1 and 2, the network traffic manager apparatus 14 of the network traffic management system is coupled to the plurality of client computing devices 12(1)-12(n) through the communication network 30, although the plurality of client computing devices 12(1)-12(n) and network traffic manager apparatus 14 may be coupled together via other topologies. Additionally, the network traffic manager apparatus 14 is coupled to the plurality of servers 16(1)-16(n) through the communication network 30, although the servers 16(1)-16(n) and the network traffic manager apparatus 14 may be coupled together via other topologies.

The network traffic manager apparatus 14 assists with managing insertion of metadata into a data stream to assist with analysis of network traffic as illustrated and described by way of the examples herein, although the network traffic manager apparatus 14 may perform other types and/or numbers of functions. As illustrated in FIG. 2, the network traffic manager apparatus 14 includes processor or central processing unit (CPU) 18, memory 20, optional configurable hardware logic 21, and a communication system 24 which are coupled together by a bus device 26 although the network traffic manager apparatus 14 may comprise other types and numbers of elements in other configurations. In this example, the bus 26 is a PCI Express bus in this example, although other bus types and links may be used.

The processors 18 within the network traffic manager apparatus 14 may execute one or more computer-executable instructions stored in memory 20 for the methods illustrated and described with reference to the examples herein, although the processor can execute other types and numbers of instructions and perform other types and numbers of operations. The processor 18 may comprise one or more central processing units ("CPUs") or general purpose processors with one or more processing cores, such as AMD® processor(s), although other types of processor(s) could be used (e.g., Intel®).

Figure 3:
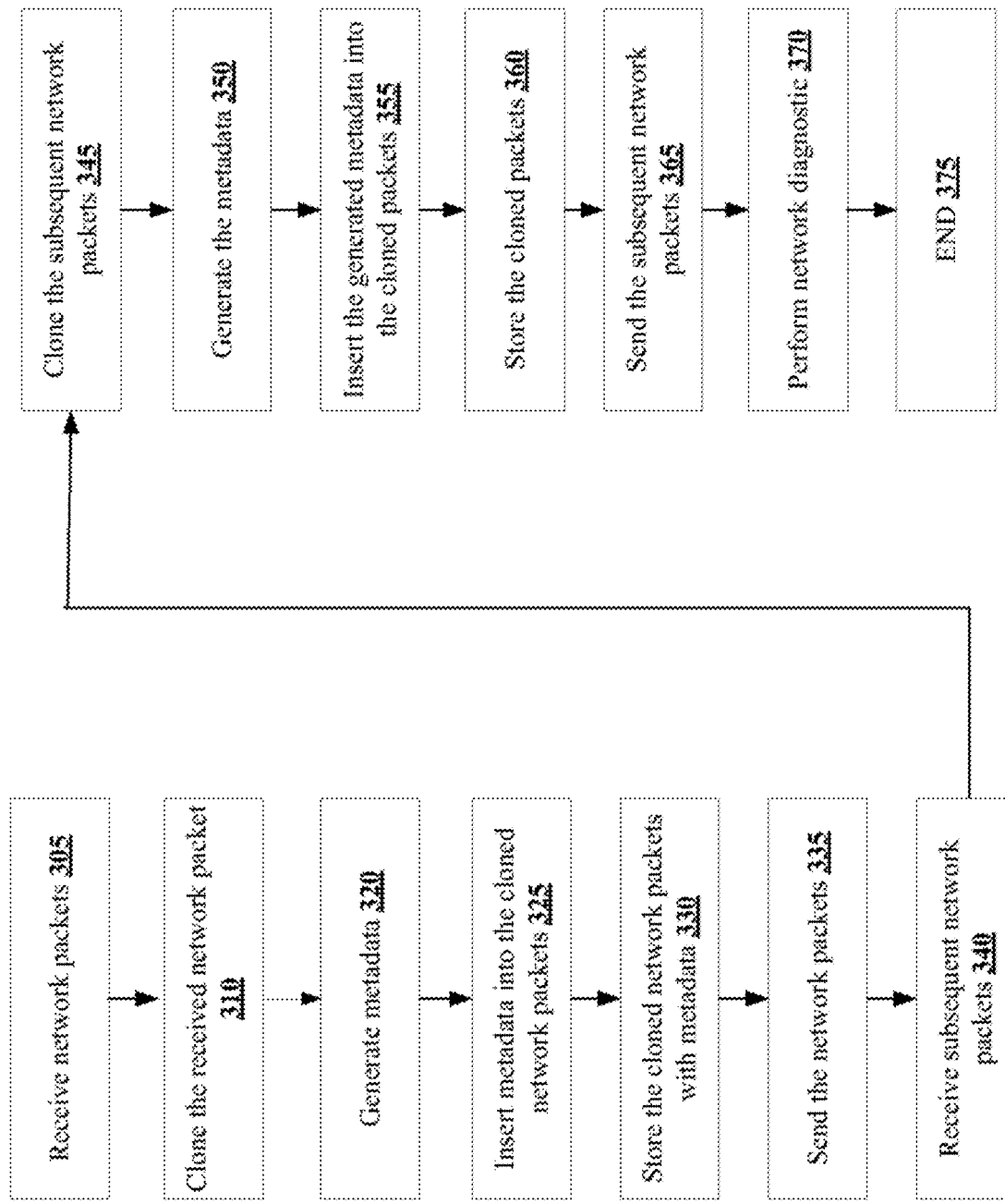
FIG. 3 is an exemplary flowchart of a method for inserting metadata into a data stream.

The memory 20 within the network traffic manager apparatus 14 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. The memory 20 may store one or more non-transitory computer-readable instructions of this technology as illustrated and described with reference to the examples herein that may be executed by the processor 18. The exemplary flowchart shown in FIG. 3 is representative of example steps or actions of this technology that may be embodied or expressed as one or more non-transitory computer or machine readable instructions stored in the memory 20 that may be executed by the processor 18 and/or may be implemented by configured logic in the optional configurable logic 21.

Accordingly, the memory 20 of the network traffic manager apparatus 14 can store one or more applications that can include computer executable instructions that, when executed by the network traffic manager apparatus 14, causes the network traffic manager apparatus 14 to perform actions, such as to transmit, receive, or otherwise process messages, for example, and to perform other actions described and illustrated below with reference to FIG. 3. The application(s) can be implemented as module or components of another application. Further, the application(s) can be implemented as operating system extensions, module, plugins, or the like. The application(s) can be implemented as module or components of another application. Further, the application(s) can be implemented as operating system extensions, module, plugins, or the like. Even further, the application(s) may be operative in a cloud-based computing environment. The application(s) can be executed within virtual machine(s) or virtual server(s) that may be managed in a cloud-based computing environment. Also, the application(s), including the network traffic manager apparatus 14 itself, may be located in virtual server(s) running in a cloud-based computing environment rather than being tied to one or more specific physical network computing devices. Also, the application(s) may be running in one or more virtual machines (VMs) executing on the network traffic manager apparatus 14. Additionally, in at least one of the various embodiments, virtual machine(s) running on the network traffic manager apparatus 14 may be managed or supervised by a hypervisor.

The optional configurable hardware logic device 21 in the network traffic manager apparatus 14 may comprise specialized hardware configured to implement one or more steps of this technology as illustrated and described with reference to the examples herein. By way of example only, the optional configurable logic hardware device 21 may comprise one or more of field programmable gate arrays ("FPGAs"), field programmable logic devices ("FPLDs"), application specific integrated circuits (ASICs") and/or programmable logic units ("PLUs").

The communication system 24 in the network traffic manager apparatus 14 is used to operatively couple and communicate between the network traffic manager apparatus 14, the plurality of client computing devices 12(1)-12(n), and the plurality of servers 16(1)-16(n) which are all coupled together by communication network 30 such as one or more local area networks (LAN) and/or the wide area network (WAN), although other types and numbers of communication networks or systems with other types and numbers of connections and configurations to other devices and elements may be used. By way of example only, the communication network such as local area networks (LAN) and the wide area network (WAN) can use TCP/IP over Ethernet and industry-standard protocols, including NFS, CIFS, SOAP, XML, LDAP, and SNMP, although other types and numbers of communication networks, can be used. In this example, the bus 26 is a PCI Express bus in this example, although other bus types and links may be used.

Each of the plurality of client computing devices 12(1)-12(n) of the network traffic management system 10, include a central processing unit (CPU) or processor, a memory, input/display device interface, configurable logic device and an input/output system or I/O system, which are coupled together by a bus or other link. The plurality of client computing devices 12(1)-12(n), in this example, may run interface applications, such as Web browsers, that may provide an interface to make requests for and send and/or receive data to and/or from the web application servers 16(1)-16(n) via the network traffic manager apparatus 14. Additionally, the plurality of client computing devices 12(1)-12(n) can include any type of computing device that can receive, render, and facilitate user interaction, such as client computers, network computer, mobile computers, mobile phones, virtual machines (including cloud-based computer), or the like. Each of the plurality of client computing devices 12(1)-12(n) utilizes the network traffic manager apparatus 14 to conduct one or more operations with the web application servers 16(1)-16(n), such as to obtain data and/or access the applications from one of the web application servers 16(1)-16(n), by way of example only, although other numbers and/or types of systems could be utilizing these resources and other types and numbers of functions utilizing other types of protocols could be performed.

Each of the plurality of servers 16(1)-16(n) of the network traffic management system include a central processing unit (CPU) or processor, a memory, and a communication system, which are coupled together by a bus or other link, although other numbers and/or types of network devices could be used. Generally, the plurality of servers 16(1)-16(n) process requests for providing access to one or more enterprise web applications received from the plurality of client computing devices 12(1)-12(n), network traffic manager apparatus 14, via the communication network 30 according to the HTTP-based application RFC protocol or the CIF S or NFS protocol in this example, but the principles discussed herein are not limited to this example and can include other application protocols. A series of applications may run on the plurality web application servers 16(1)-16(n) that allows the transmission of applications requested by the plurality of client computing devices 12(1)-12(n), or the network traffic manager apparatus 14. The plurality of servers 16(1)-16(n) may provide data or receive data in response to requests directed toward the respective applications on the plurality of servers 16(1)-16(n) from the plurality of client computing devices 12(1)-12(n) or the network traffic manager apparatus 14. It is to be understood that the plurality of servers 16(1)-16(n) may be hardware or software or may represent a system with multiple external resource servers, which may include internal or external networks. In this example the plurality of servers 16(1)-16(n) may be any version of Microsoft® IIS servers or Apache® servers, although other types of servers may be used.

Although the plurality of servers 16(1)-16(n) are illustrated as single servers, each of the plurality of servers 16(1)-16(n) may be distributed across one or more distinct network computing devices. Moreover, the plurality of servers 16(1)-16(n) are not limited to a particular configuration. Thus, the plurality of plurality web application servers 16(1)-16(n) may contain a plurality of network computing devices that operate using a master/slave approach, whereby one of the network computing devices of the plurality of servers 16(1)-16(n) operate to manage and/or otherwise coordinate operations of the other network computing devices. The plurality of servers 16(1)-16(n) may operate as a plurality of network computing devices within cluster architecture, a peer-to peer architecture, virtual machines, or within a cloud architecture.

Thus, the technology disclosed herein is not to be construed as being limited to a single environment and other configurations and architectures are also envisaged. For example, the one or more of the plurality of servers 16(1)-16(n) depicted in FIG. 1 can operate within network traffic manager apparatus 14 rather than as a stand-alone server communicating with network traffic manager apparatus 14 via the communication network(s) 30. In this example the plurality of servers 16(1)-16(n) operate within the memory 20 of the network traffic manager apparatus 14.

While the network traffic manager apparatus 14 is illustrated in this example as including a single device, the network traffic manager apparatus 14 in other examples can include a plurality of devices or blades each with one or more processors each processor with one or more processing cores that implement one or more steps of this technology. In these examples, one or more of the devices can have a dedicated communication interface or memory. Alternatively, one or more of the devices can utilize the memory, communication interface, or other hardware or software components of one or more other communicably coupled of the devices. Additionally, one or more of the devices that together comprise network traffic manager apparatus 14 in other examples can be standalone devices or integrated with one or more other devices or applications, such as one of the plurality of servers 16(1)-16(n) or, the network traffic manager apparatus 14, or applications coupled to the communication network(s), for example. Moreover, one or more of the devices of the network traffic manager apparatus 14 in these examples can be in a same or a different communication network 30 including one or more public, private, or cloud networks, for example.

Although an exemplary network traffic management system 10 with the plurality of client computing devices 12(1)-12(n), the network traffic manager apparatus 14, and the plurality of servers 16(1)-16(n), communication networks 30 are described and illustrated herein, other types and numbers of systems, devices, blades, components, and elements in other topologies can be used. It is to be understood that the systems of the examples described herein are for exemplary purposes, as many variations of the specific hardware and software used to implement the examples are possible, as will be appreciated by those skilled in the relevant art(s).

Further, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

One or more of the components depicted in the network traffic management system, such as the network traffic manager apparatus 14, the plurality of client computing devices 12(1)-12(n), the plurality of servers 16(1)-16(n), for example, may be configured to operate as virtual instances on the same physical machine. In other words, one or more of network traffic manager apparatus 14, the plurality of client computing devices 12(1)-12(n), or the plurality of servers 16(1)-16(n) illustrated in FIG. 1 may operate on the same physical device rather than as separate devices communicating through a network as depicted in FIG. 1. There may be more or fewer plurality of client computing devices 12(1)-12(n), network traffic manager apparatus 14, or the plurality of servers 16(1)-16(n) than depicted in FIG. 1. The plurality of client computing devices 12(1)-12(n), the plurality of servers 16(1)-16(n) could be implemented as applications on network traffic manager apparatus 14.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples also may be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

Figure 4:
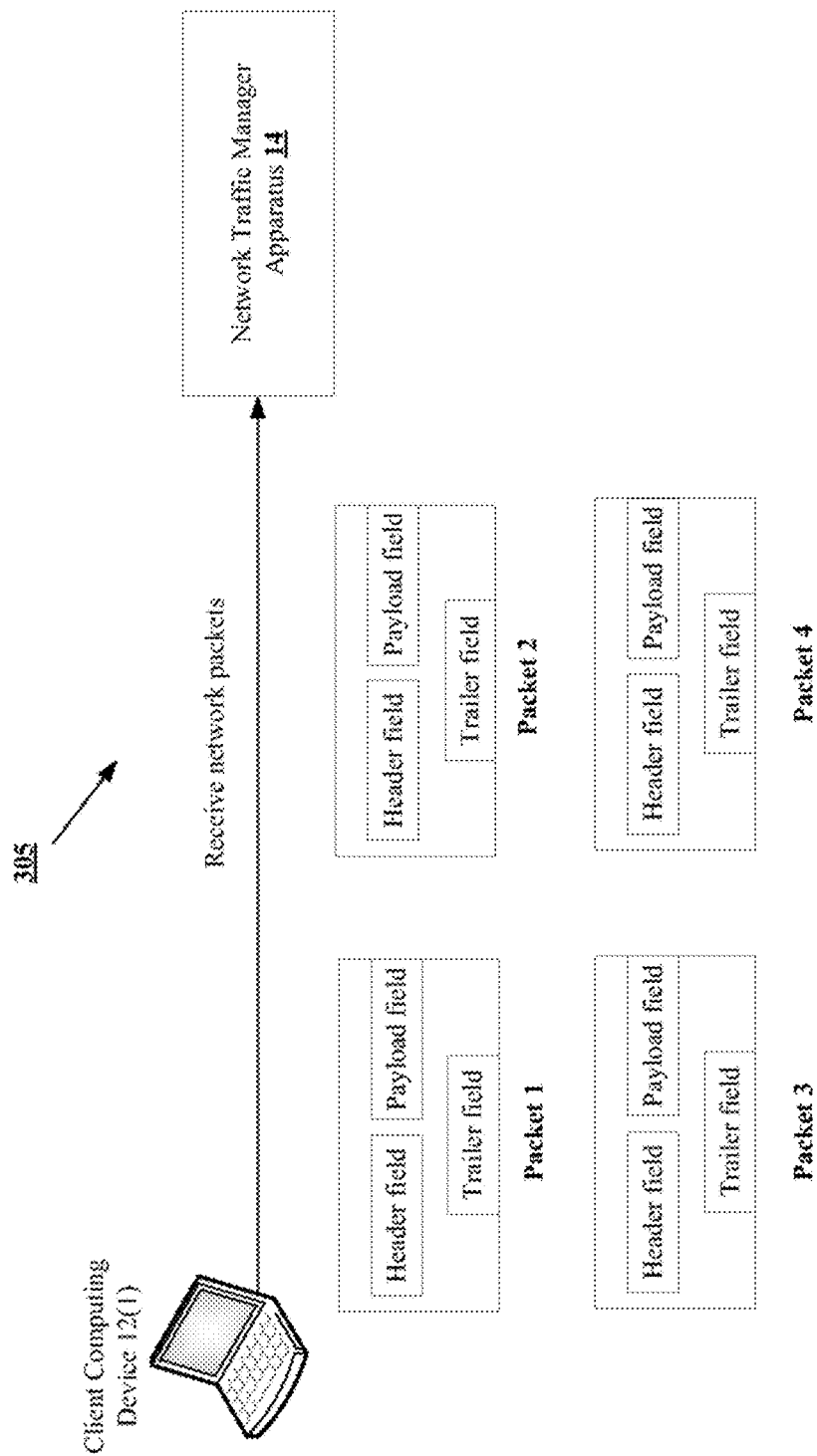
FIG. 4 is an exemplary block diagram illustrating the network traffic manager apparatus receiving network packets.

An example of a method for managing insertion of metadata into a data stream to assist with analysis of network traffic will now be described with reference to FIGS. 1-15. First in step 305, the network traffic manager apparatus 14, receives a plurality of network packets (also called request packets) from one of the plurality of client computing devices 12(1)-12(n), although the network traffic manager apparatus 14 can receive network packets from other sources. In this example, the received plurality of network packets includes a header field, a payload field, and a trailer field. Additionally, the header field of a network packet includes an internet protocol, size of the header and the payload, the source and destination address, a sixteen-bit identification number, flags which are used to let a router know if it can fragment a packet, fragmentation offsets, time to live, a checksum to detect errors, and the number of hops a packet can make, although the header field can include other types or amounts of information. Further, the payload field of the received network packets includes the actual data being sent, and the trailer field includes bits which signify the end of a packet. An example of the step 305 is illustrated in FIG. 4, by way of example. In FIG. 4, the network traffic manager apparatus 14 receives a plurality of network packets: packet 1, packet 2, packet 3, and packet 4 transmitted from one of the plurality of client computing devices 12(1)-12(n) and directed to one of the plurality of servers 16(1)-16(n).

Figure 5:
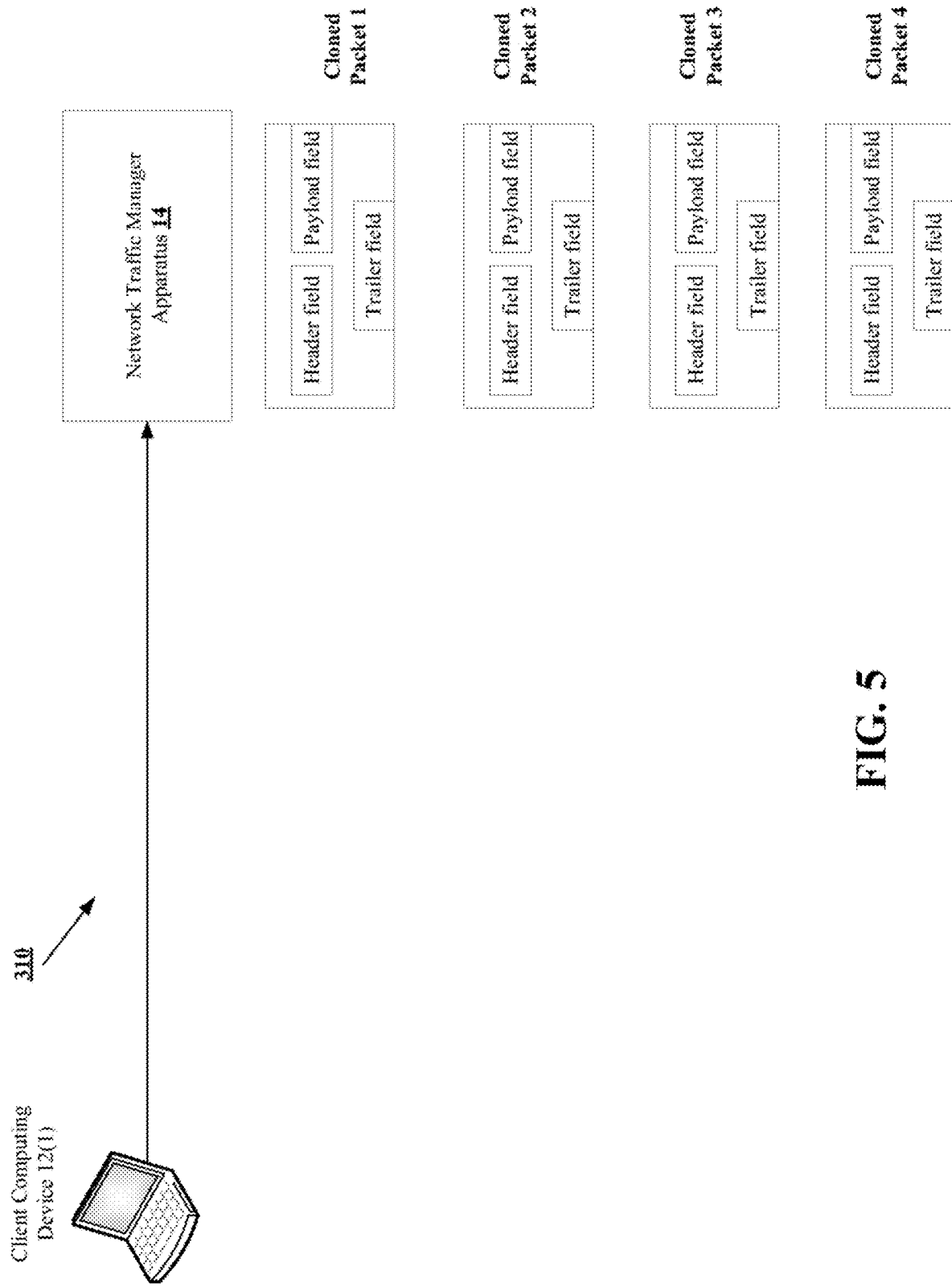
FIG. 5 is an exemplary block diagram illustrating cloning of the network packets.

In step 310, the network traffic manager apparatus 14 clones the received plurality of network packets and in this example, cloning of the network packets relates to creating network packets with same header and payload as that of the received plurality of network packets. An illustration of cloning of the network packet is illustrated in FIG. 5, by way of example. In this example, the network traffic manager apparatus 14 clones packet 1, packet 2, packet 3, and packet 4 to create a new cloned packet 1, cloned packet 2, cloned packet 3, and cloned packet 4 respectively. As illustrated above, the cloned packet 1 includes the same header field and the payload field of the packet 1, cloned packet 2 includes the same header field and the payload field of the packet 2, cloned packet 3 includes the same header field and the payload field of packet 3, and cloned packet 4 includes the same header field and the payload field of packet 4. In this example, the cloned plurality of network packets assists with storing the metadata (further illustrated below) which can be used to analyze the state of the current connection or session while the plurality of network packets received from one of the plurality of client computing devices 12(1)-12(n) can be sent to the one of the plurality of servers 16(1)-16(n) without delay.

Referring back to FIG. 3, in step 320, the network traffic manager apparatus 14 generates metadata including state information of the connection or the session with the requesting one of the plurality of client computing devices 12(1)-12(n) for at least two or more of the cloned plurality of network packets, although again other types of metadata may be generated. In this example, the generated metadata can include state information can include data associated with the session history associated with the requesting one of the plurality of client computing devices 12(1)-12(n), session identification number, although the metadata can include other types or amounts of information.

Figure 6:
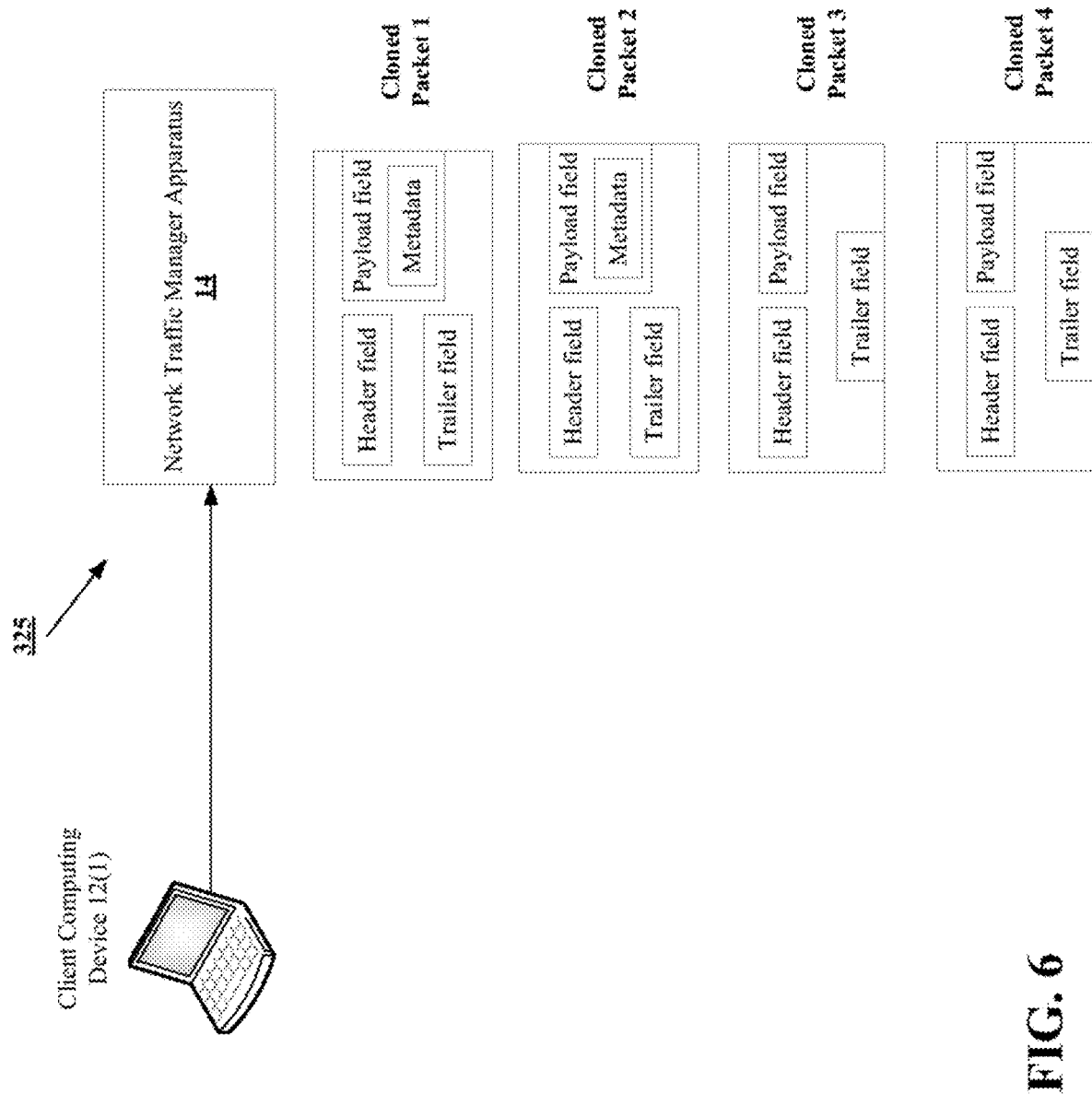
FIG. 6 is an exemplary block diagram illustrating inserting metadata into the cloned network packets.

In step 325, the network traffic manager apparatus 14 inserts the generated metadata into the payload field of each of the cloned plurality of network packets, although the generated metadata can be inserted into other fields within the cloned network packets. Alternatively in another example, the network traffic manager apparatus 14 can insert the generated metadata into one of the plurality of cloned network packets. An example of inserting the generated metadata is illustrated in FIG. 6. The example illustrated in FIG. 6 includes the network traffic manager apparatus 14 inserting the metadata including the state information into the payload field of the cloned packet 1 and cloned packet 2. In another example, the network traffic manager apparatus 14 can include the generated metadata into the payload field of the one or more of the received plurality of network packets.

Figure 7:
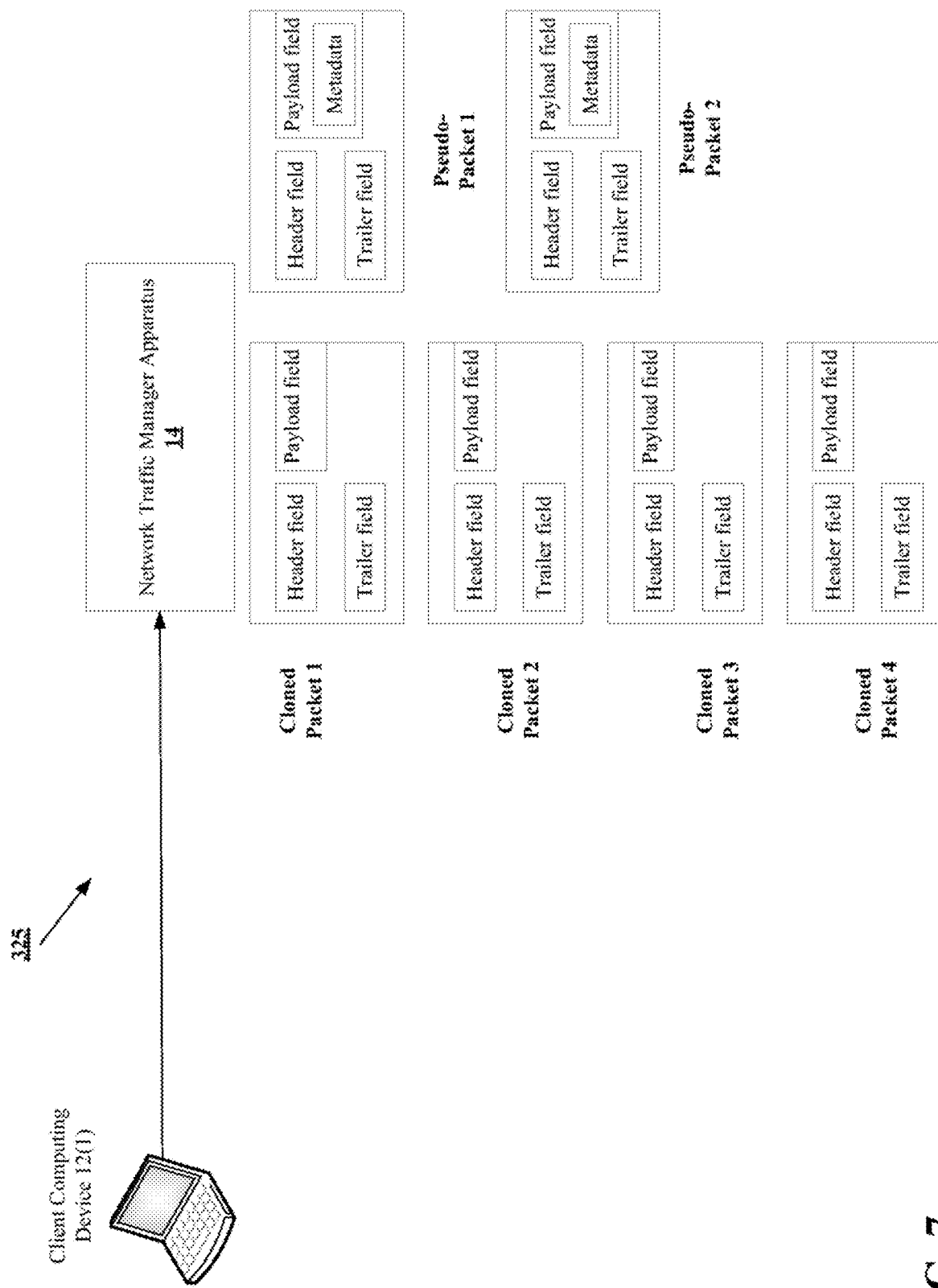
FIG. 7 is an exemplary block diagram illustrating creating pseudo-packets and inserting the metadata.

Alternatively, the network traffic manager apparatus 14 can create additional network packets (or pseudo-packets) and include the metadata into one or more of the created additional network packets. An illustration of inserting the generated metadata into all of the created additional network packets is represented in FIG. 7. By way of example, the network traffic manager apparatus 14 creates two new network packets or pseudo-packets (packets with no payload data in the payload field), pseudo-packet 1 and pseudo-packet 2. Further, the network traffic manager apparatus 14 inserts the generated metadata into the payload field of the newly pseudo-packet 1 and pseudo-packet 2 as illustrated in FIG. 7, by way of example. The network traffic manager apparatus 14 also adds the created pseudo-packets with the generated metadata to the series of cloned plurality of network packets and sends the additional packets along with the cloned plurality of network packets for further analysis.

Additionally, the network traffic manager apparatus 14 does not need to wait until the receipt of plurality of network packets (illustrated in step 305) prior to creating the additional network packets. In other words, in this example the network traffic manager apparatus 14 can create the additional network packets and insert the generated metadata when there is a change in the state information, although the network traffic manager apparatus 14 can create the additional network packets based on other parameters. By inserting the generated metadata into the cloned packets or the additional packets, the disclosed technology is able to assist with using the current state information as a reference to analyze the network traffic.

Figure 8:
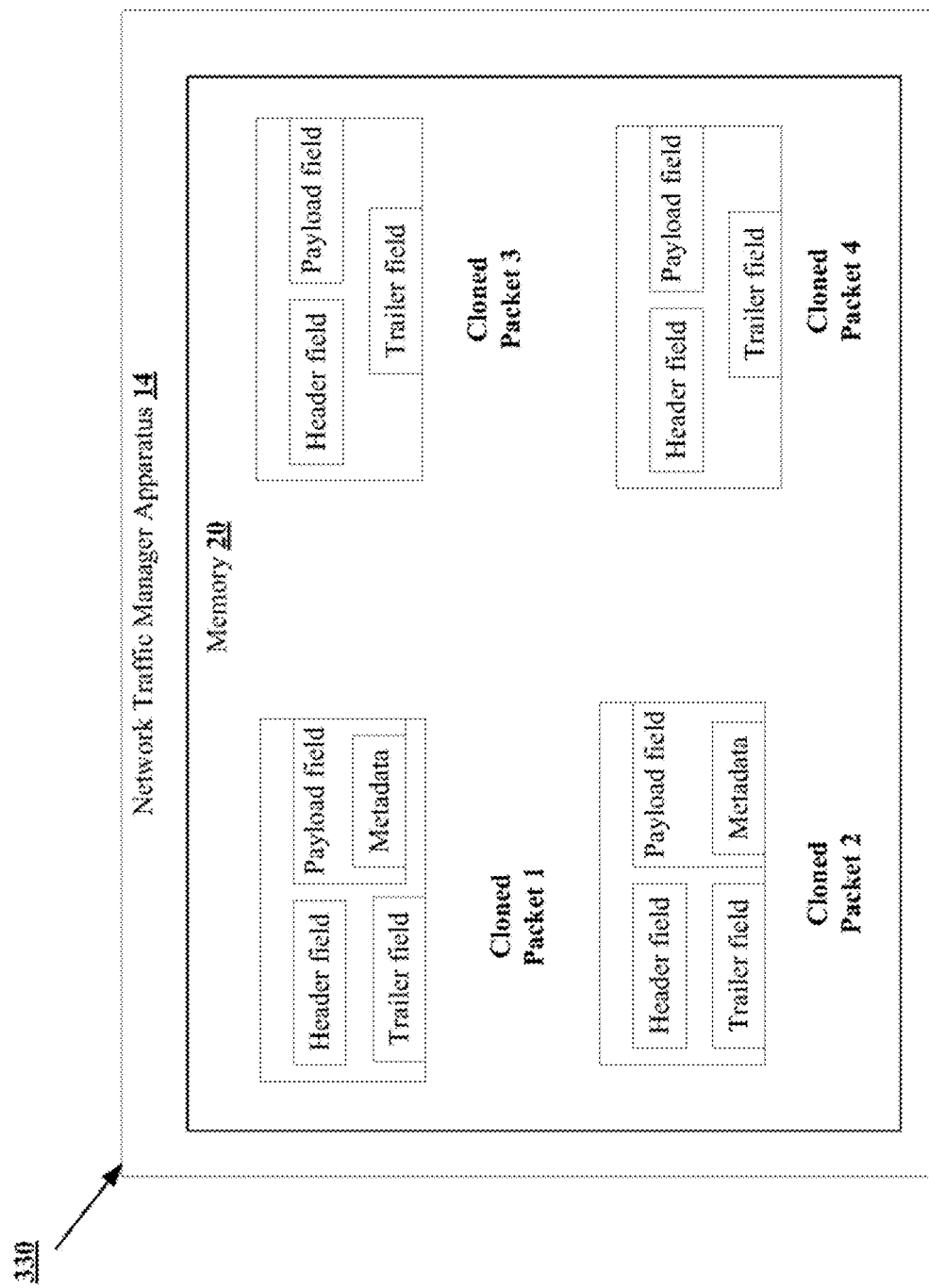
FIG. 8 is an exemplary block diagram illustrating storing the cloned network packets with the metadata.

Referring back to FIG. 3, in step 330, the network traffic manager apparatus 14 stores the cloned plurality of network packets with the metadata within the memory 20, although the network traffic manager apparatus 14 can store the cloned plurality of network packets at other memory locations. An illustration of the network traffic manager apparatus 14 storing the cloned plurality of network packets with the metadata is represented in FIG. 8. By storing the cloned plurality of network packets, the disclosed technology is able to use the metadata within the cloned plurality of network packets to perform a network diagnostic operation or to analyze the network traffic associated with the current connection or session. By way of example, network diagnostic operation can include dropping the network packets, throttling network packets, or sending network packets to a specific server using load balancing technique by way of example only, although network diagnostic operation can include other types of operations. By way of example, the metadata in the stored and cloned plurality of network packets can be used by other applications to analyze the metadata and the corresponding cloned plurality of network packets. Alternatively in another example, the network traffic manager apparatus 14 can only store the network packet(s) with the metadata or can only store the metadata within the memory 20.

Figure 9:
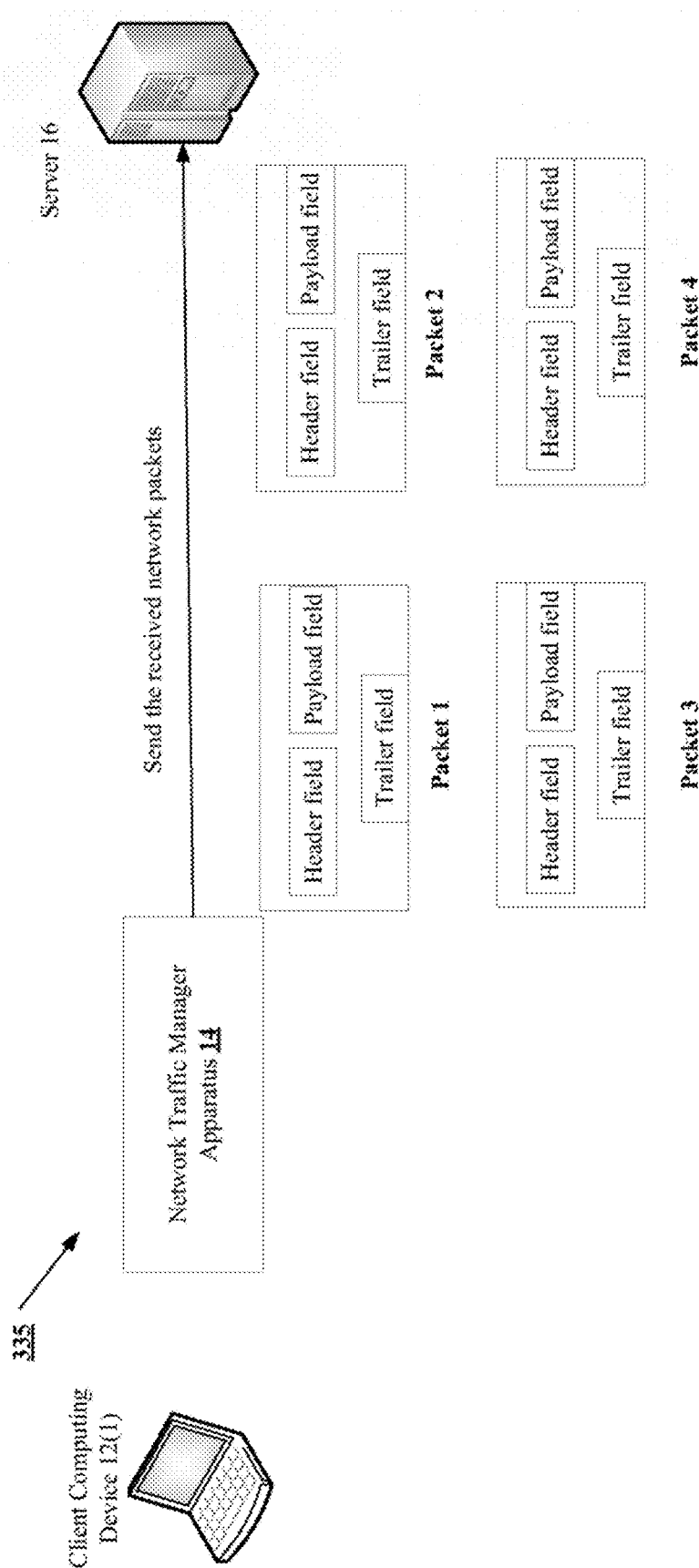
FIG. 9 is an exemplary block diagram illustrating sending the received network packets to a server.

In step 335, the network traffic manager apparatus 14 sends the plurality of network packets received from one of the plurality of client computing devices 12(1)-12(n) to one of the plurality of servers 16(1)-16(n) based on the destination address in the header field of the network packets without the metadata. An illustration of the network traffic manager apparatus 14 sending the plurality of network packets received from one of the plurality of client computing devices 12(1)-12(n) is illustrated in FIG. 9. Additionally in this example, the network traffic manager apparatus 14 can place the cloned plurality of network packets with the metadata into the stream of packets sent to one of the plurality of servers 16(1)-16(n) for further analysis. Alternatively, in another example, the network traffic manager apparatus 14 can send the plurality of network packets received from one of the plurality of client computing devices 12(1)-12(n) to one of the plurality of servers 16(1)-16(n) based on the destination address in the header field of the network packets with the metadata in the payload field without the cloned plurality of network packets.

In step 340, the network traffic manager apparatus 14 receives a plurality of subsequent network packets from the responsive one of the plurality of servers 16(1)-16(n). In this example, the received plurality of subsequent network packets includes a header field, a payload field, and a trailer field.

Figure 10:
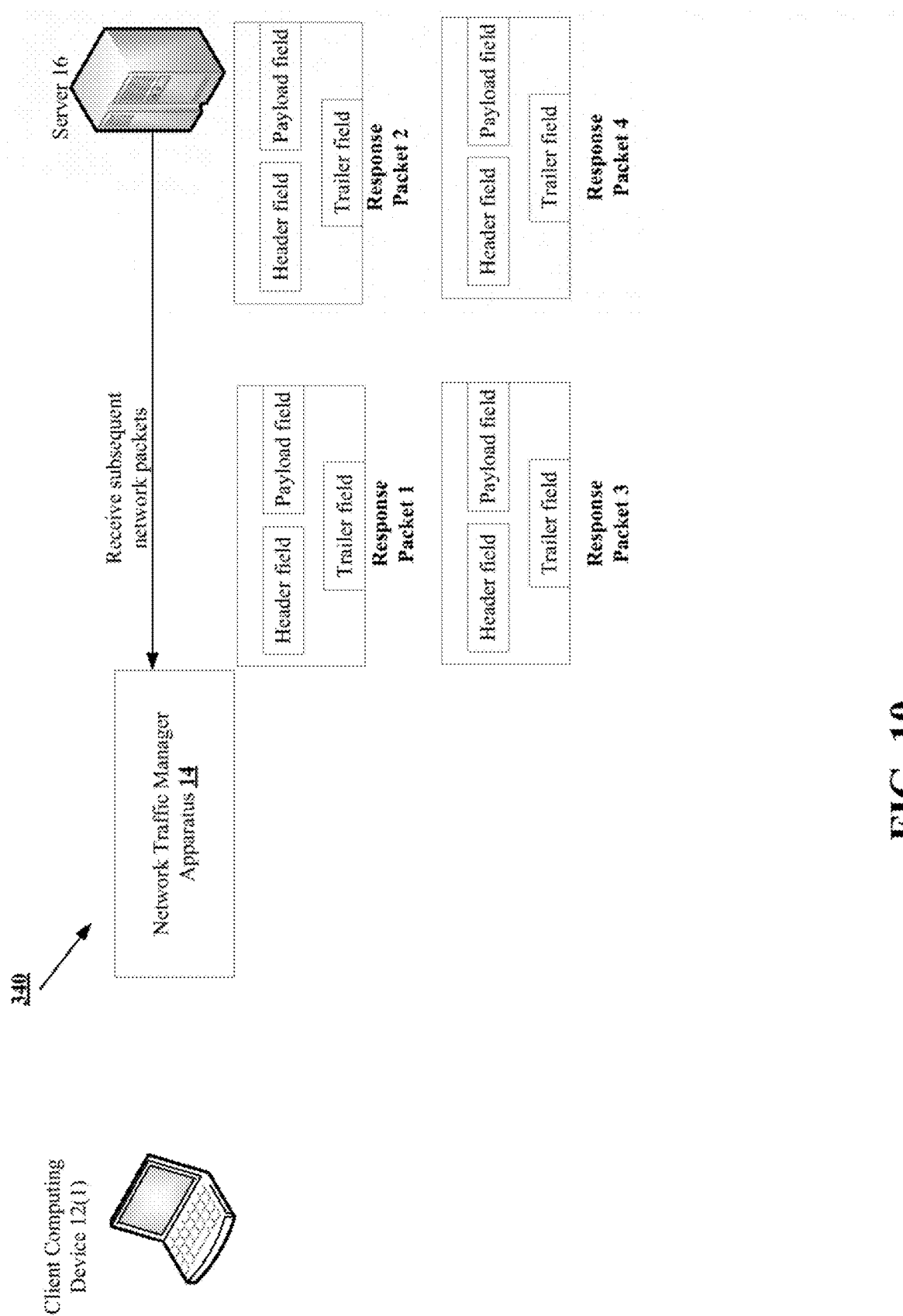
FIG. 10 is an exemplary block diagram illustrating receiving subsequent network packets from the server.

Further, the header field of a subsequent network packet includes an internet protocol, size of the header and the payload, the source and destination address, a sixteen-bit identification number, flags which are used to let a router know if it can fragment a packet, fragmentation offsets, time to live, a checksum to detect errors, and the number of hops a packet can make, although the header field can include other types or amounts of information. Furthermore, the payload field of the received subsequent network packets includes the actual data being sent, and the trailer field includes bits which signify the end of a packet. An illustration of the network traffic manager apparatus 14 receiving the plurality of subsequent network packets is illustrated FIG. 10. As illustrated in FIG. 10, the network traffic manager apparatus 14 receives response packet 1, response packet 2, response packet 3, and response packet 4, including the header field, payload field, and the trailer field, from the responsive one of the plurality of servers 16(1)-16(n).

Figure 11:
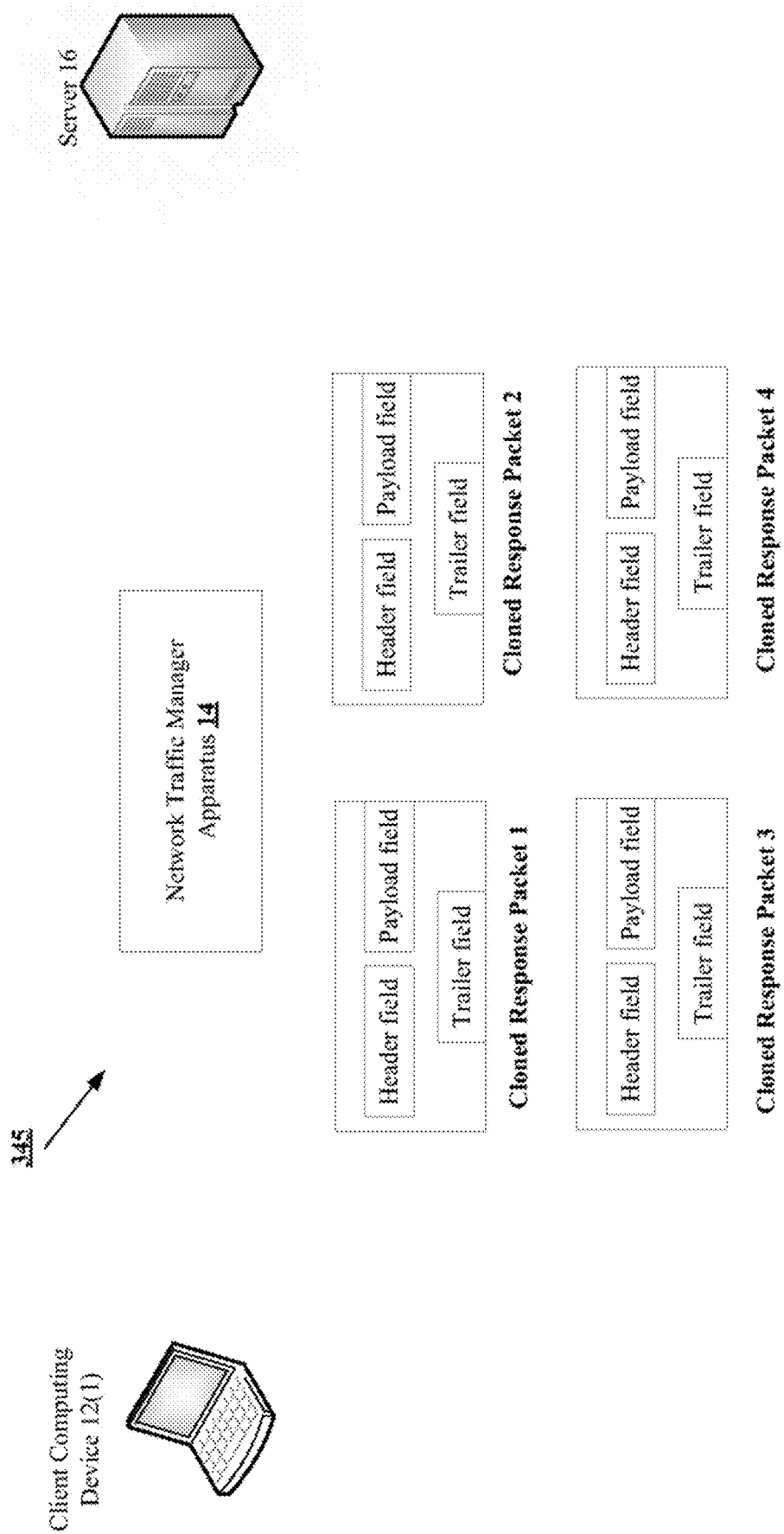
FIG. 11 is an exemplary block diagram illustrating cloning of the received subsequent network packets.

Referring back to FIG. 3, in step 345, the network traffic manager apparatus 14 clones the received plurality of subsequent network packets. In this example, cloning of the received plurality of subsequent network packets relates to creating new network packets and copying the data in the header field, payload field, and the trailer field of the received subsequent network packets. An illustration of the network traffic manager apparatus 14 cloning the received plurality of subsequent network packets is illustrated in FIG. 11, by way of example. As illustrated in FIG. 11, the network traffic manager apparatus 14 clones to received response packet 1, response packet 2, response packet 3, and the response packet 4 to form cloned response packet 1, cloned response packet 2, cloned response packet 3, and cloned response packet 4. In this example, the cloned plurality of subsequent network packets assists with storing the metadata that can be further used to analyze the state of the connection or session while the plurality of subsequent network packets can be sent to the one of the plurality of client computing devices 12(1)-12(n) without delay.

In step 350, the network traffic manager apparatus 14 generates new metadata including the state information of the connection or session with the responding one of the plurality of servers 16(1)-16(n) for at least two or more of the received plurality of subsequent network packets, although the network traffic manager apparatus 14 can generate the metadata may comprise other parameters. In this example, the new metadata generated includes session identification data associated with the session established between the network traffic manager apparatus 14 or the requesting one of the plurality of client computing devices 12(1)-12(n) and the responding one of the plurality of servers 16(1)-16(n), although the new metadata can include other types or amounts of information such as secure socket layer connection metadata, connection state information, hardware acceleration metadata, timing data associated with the network packets, or historical context related to the connection. By generating the new metadata after receiving the plurality of subsequent network packets, the disclosed technology is able to compare the metadata that was stored in step 330 and analyze the changes to the state information and/or network traffic.

Figure 12:
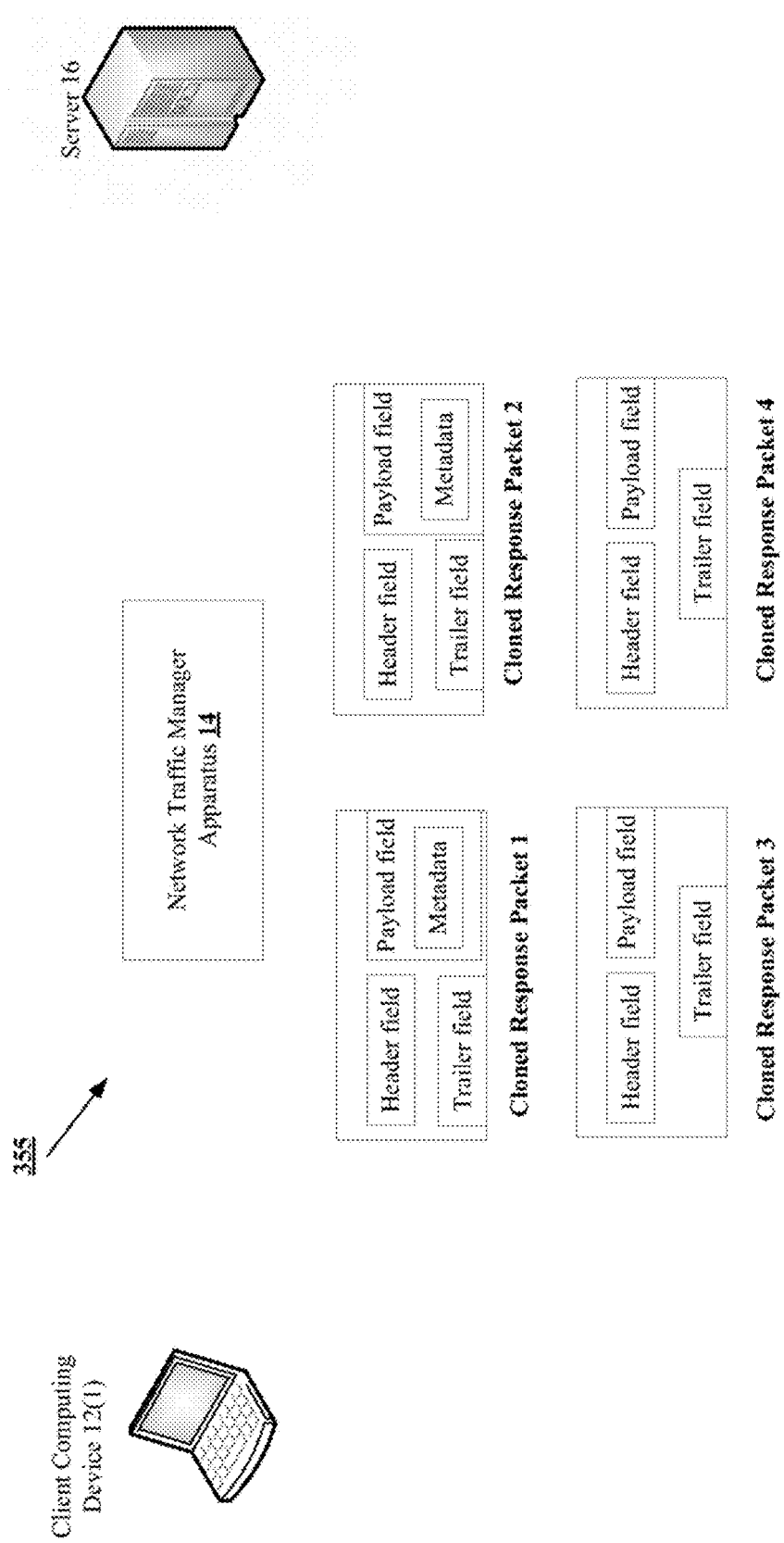
FIG. 12 is an exemplary block diagram illustrating inserting new metadata into the cloned subsequent network packets.

In step 355, the network traffic manager apparatus 14 inserts the generated new metadata into the payload field of the one or more cloned plurality of subsequent network packets, although the new metadata can be included into the payload field of all the cloned plurality of subsequent network packets. An illustration of the network traffic manager apparatus 14 inserting the generated new metadata into the payload field of the one or more cloned plurality of subsequent network packets is illustrated in FIG. 12. In the example illustrated in FIG. 12, the network traffic manager apparatus 14 inserts the generated new metadata into payload field of the cloned response packet 1 and cloned response packet 2. In another example, the network traffic manager apparatus 14 can include the generated new metadata into the payload field of one of more of the received plurality of subsequent network packets.

Figure 13:
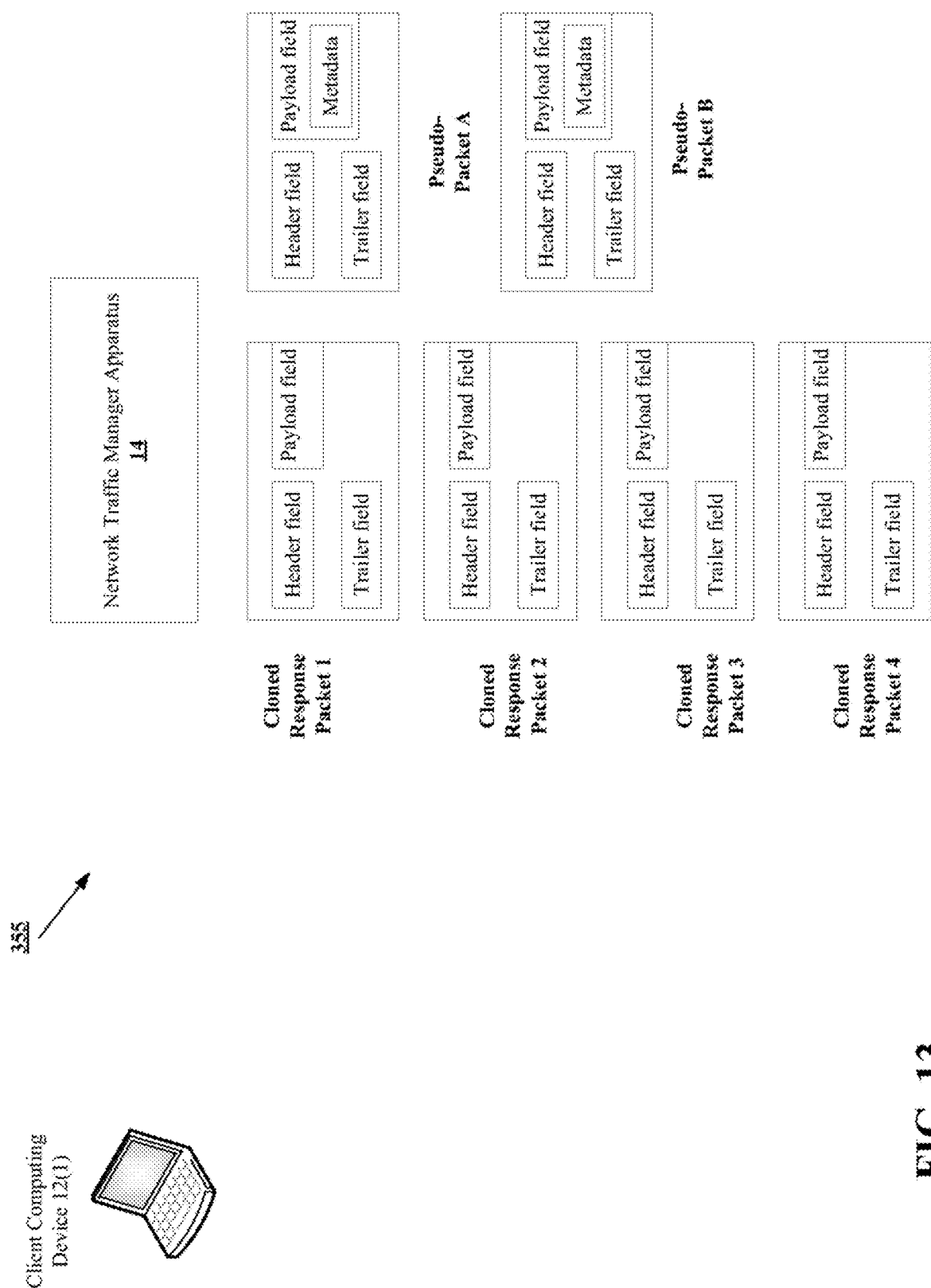
FIG. 13 is an exemplary block diagram illustrating generating pseudo-packets and inserting the new metadata into the pseudo-packets.

Alternatively, the network traffic manager apparatus 14 can create additional network packets (or pseudo-packets) and insert the generated new metadata into one or more of the created additional network packets. An example of the network traffic manager apparatus 14 creating pseudo-packets and inserting the new metadata into the payload field is illustrated in FIG. 13. By way of example, the network traffic manager apparatus 14 creates two new pseudo-packets: pseudo packet A and pseudo-packet B and inserts the new metadata into the payload field of both the pseudo packets. Further in this example, the network traffic manager apparatus 14 can add the created additional network packets with the generated new metadata to the cloned plurality of subsequent network packets and sends the additional packets along with the cloned plurality of subsequent network packets for further analysis.

Additionally in this example, the network traffic manager apparatus 14 need not have to wait until the receipt of plurality of subsequent network packets prior to creating the additional network packets. In other words, the network traffic manager apparatus 14 can create the additional network packets and insert the generated metadata when there is a change in the state information, although the network traffic manager apparatus 14 can create the additional network packets based on other parameters. By inserting the generated new metadata into the cloned packets or the additional packets, the disclosed technology is able to assist with using the current state information as a reference to analyze the network traffic.

Figure 14:
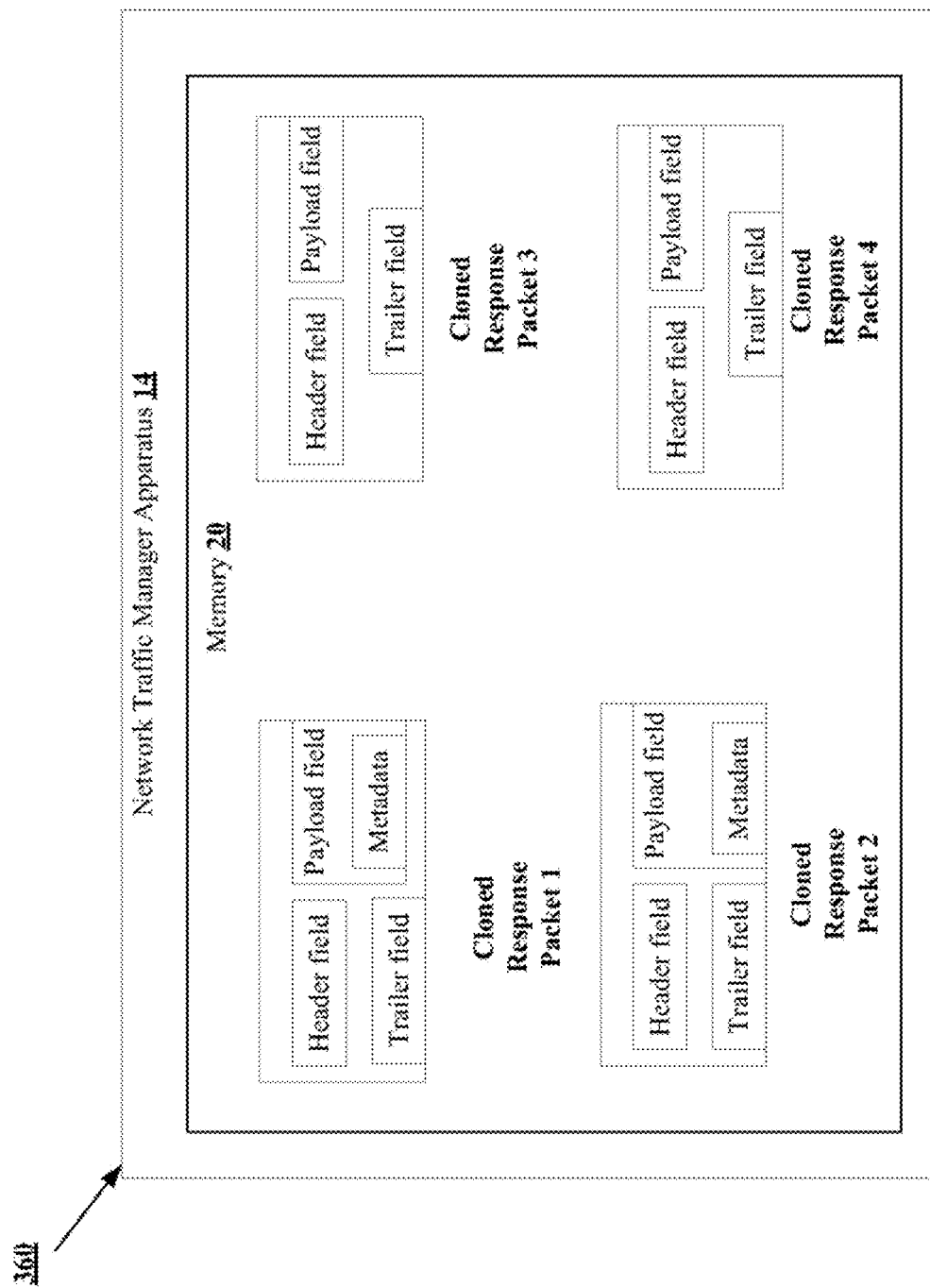
FIG. 14 is an exemplary block diagram illustrating storing of the cloned subsequent network packets within a memory.

Referring back to FIG. 3, in step 360, the network traffic manager apparatus 14 stores the cloned plurality of subsequent network packets with the generated new metadata within the memory 20, although the network traffic manager apparatus 14 can store the cloned plurality of subsequent network packets at other memory locations. An example of the storing the cloned plurality of subsequent network packets within the memory 20 is illustrated in FIG. 14. By way of example, the network traffic manager apparatus 14 stores the cloned response packet 1, cloned response packet 2, cloned response packet 3, and cloned response packet 4 within the memory 20 as illustrated in FIG. 14.

By storing the cloned plurality of subsequent network packets, the disclosed technology is able to use the metadata within the cloned plurality of subsequent network packets to perform network diagnostic operation or to analyze the network traffic associated with the current connection or session. By way of example, network diagnostic operation can include dropping the network packets, throttling network packets, or sending network packets to a specific server using load balancing technique by way of example only, although network diagnostic operation can include other types of operations. By way of example, the generated new metadata in the stored and cloned plurality of subsequent network packets can be used by other applications to analyze the metadata and the corresponding cloned plurality of network packets. Alternatively in another example, the network traffic manager apparatus 14 can only store the network packet(s) with the generated new metadata or can only store the generated new metadata within the memory 20.

Figure 15:
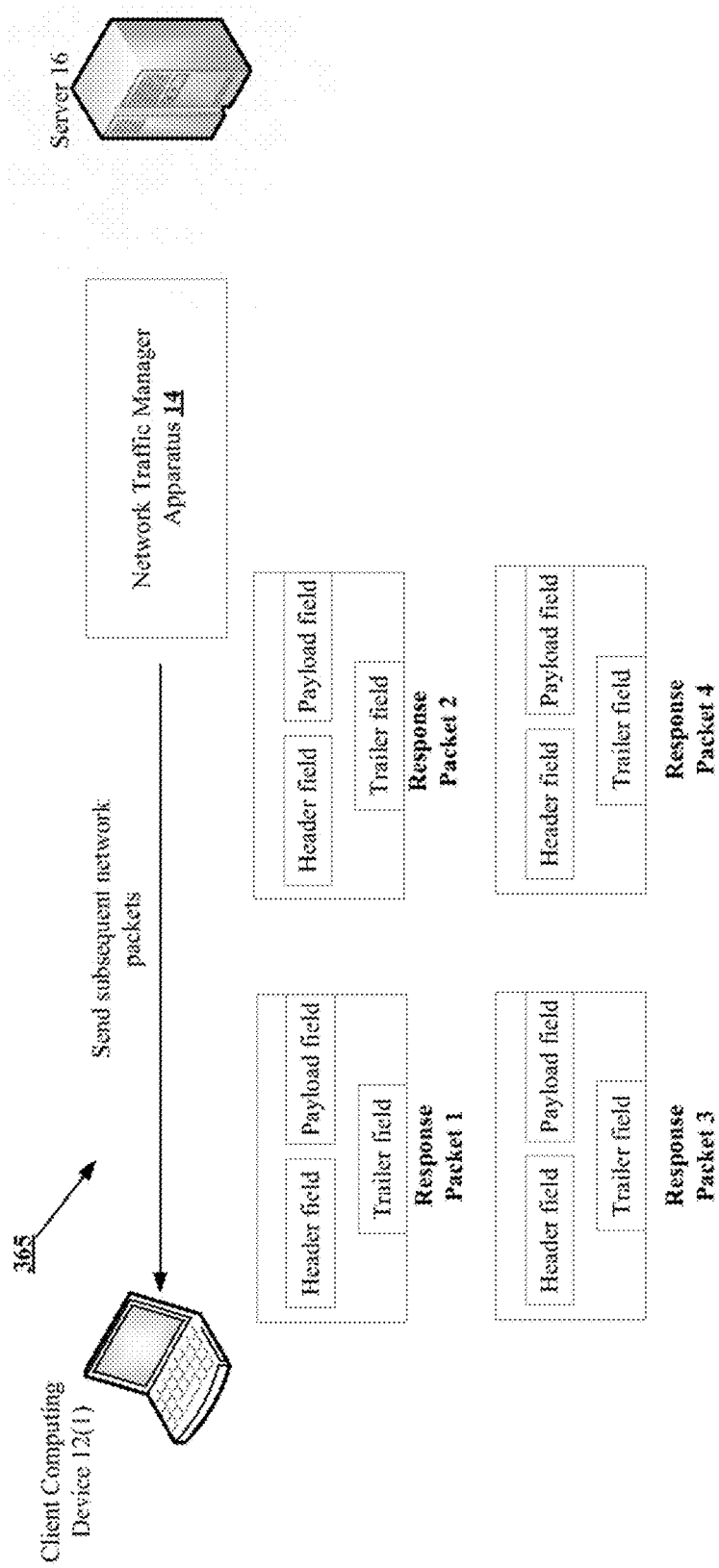
FIG. 15 is an exemplary block diagram illustrating sending of the subsequent network packets to the client device.

Referring back to FIG. 3, in step 365, the network traffic manager apparatus 14 sends the received plurality of subsequent network packets to the requesting one of the plurality of client computing devices 12(1)-12(n) without the generated new metadata. An illustration of the network traffic manager apparatus 14 sending the received plurality of subsequent network packets to the requesting one of the plurality of client computing devices 12(1)-12(n) is illustrated in FIG. 15. By way of example, the network traffic manager apparatus 14 sends the response packet 1, response packet 2, response packet 3, and response packet 4 to the requesting one of the plurality of client computing devices 12(1)-12(n). Additionally in this example, the network traffic manager apparatus 14 can place the cloned plurality of subsequent network packets with the generated new metadata into the stream of plurality of subsequent network packets that are sent to the requesting one of the plurality of client computing devices 12(1)-12(n) for further analysis. Alternatively, in another example, the network traffic manager apparatus 14 can send the received plurality of subsequent network packets based on the destination address in the header field of the network packets to the requesting one of the plurality of client computing devices 12(1)-12(n) with the metadata in the payload field but without the cloned plurality of network packets.

In step 370, the network traffic manger apparatus 14 performs network diagnostics by comparing the metadata stored in the cloned plurality of network packets and the new metadata in the stored in the cloned plurality of subsequent network packets, stored within the memory 20. While the step of performing the diagnostics using the metadata is listed as a separate step, the network traffic manager apparatus 14 can continue to perform the network diagnostic in parallel while performing steps 305-365. By performing the network diagnostic on the stored metadata in the cloned plurality of network packets and the new metadata in the plurality of subsequent network packets, the disclosed technology is able to determine and perform necessary actions, such as dropping the network packets, throttling network packets, or sending network packets to a specific server using load balancing technique by way of example only, although other types of actions can be identified by the network traffic manager apparatus 14. The exemplary method ends at step 375.

Accordingly, this technology provides a number of advantages including providing methods, non-transitory computer readable media, apparatuses, and systems that assist with managing network traffic with the insertion of diagnostic metadata into a data stream. In examples of the disclosed technology, metadata can be added to the cloned network packets or pseudo-packets can be inserted into the data stream to provide information on the status or actions taken by the network traffic manager apparatus. By using the diagnostic metadata in the cloned network packets or pseudo-packets, the disclosed technology is able to more effectively and efficiently transfer the received network packets to the destination with less delay.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. A method implemented by a network traffic management system comprising one or more network traffic apparatuses, client devices, or server devices, the method comprising:
generating metadata comprising state information for a received network packet, wherein the state information includes data associated with a session history of the received network packet;
inserting the generated metadata into an additional network packet, wherein the additional network packet is created for the received network packet;
sending the received network packet to a destination device without including the generated metadata and without performing a network diagnostic operation on the received network packet; and
performing the network diagnostic operation only on the additional network packet.

2. The method as set forth in claim 1, further comprising:
adding the additional network packet to a series of cloned plurality of network packets, and
performing the network diagnostic operation on the series of cloned plurality of network packets.

3. The method as set forth in claim 2, wherein the additional network packet is a pseudo packet with no payload data in a payload field.

4. The method as set forth in claim 1, wherein the additional network packet is created when the state information for the received network packet is changed.

5. The method as set forth in claim 1 further comprising, storing the additional network packet comprising the generated metadata in memory as a reference when analyzing network traffic.

6. A non-transitory computer readable medium having stored thereon instructions for inserting metadata into a data stream comprising executable code which when executed by one or more processors, causes the processors to:
generate metadata comprising state information for a received network packet, wherein the state information includes data associated with a session history of the received network packet;
insert the generated metadata into an additional network packet, wherein the additional network packet is created for the received network packet;
send the received network packet to a destination device without including the generated metadata and without performing a network diagnostic operation on the received network packet; and
perform the network diagnostic operation only on the additional network packet.

7. The medium as set forth in claim 6, wherein the one or more processors are further configured to be capable of executing the executable code to:
add the additional network packet to a series of cloned plurality of network packets, and
perform the network diagnostic operation on the series of cloned plurality of network packets.

8. The medium as set forth in claim 7, wherein the additional network packet is a pseudo packet with no payload data in a payload field.

9. The medium as set forth in claim 6, wherein the additional network packet is created when the state information for the received network packet is changed.

10. The medium as set forth in claim 6 wherein the one or more processors are further configured to be capable of executing the executable code to store the additional network packet comprising the generated metadata in memory as a reference when analyzing network traffic.

11. A network traffic manager apparatus, comprising memory comprising programmed instructions stored in the memory and one or more processors configured to be capable of executing the programmed instructions stored in the memory to:
generate metadata comprising state information for a received network packet, wherein the state information includes data associated with a session history of the received network packet;
insert the generated metadata into an additional network packet, wherein the additional network packet is created for the received network packet;
send the received network packet to a destination device without including the generated metadata and without performing a network diagnostic operation on the received network packet; and
perform the network diagnostic operation only on the additional network packet.

12. The apparatus as set forth in claim 11 wherein the one or more processors are further configured to be capable of executing the programmed instructions stored in the memory to:
add the additional network packet to a series of cloned plurality of network packets, and
perform the network diagnostic operation on the series of cloned plurality of network packets.

13. The apparatus as set forth in claim 12, wherein the additional network packet is a pseudo packet with no payload data in a payload field.

14. The apparatus as set forth in claim 11, wherein the additional network packet is created when the state information for the received network packet is changed.

15. The apparatus as set forth in claim 11 wherein the one or more processors are further configured to be capable of executing the programmed instructions stored in the memory to store the additional network packet comprising the generated metadata in memory as a reference when analyzing network traffic.

16. A network traffic management system, comprising one or more traffic management apparatuses, client devices, or server devices, the network traffic management system comprising memory comprising programmed instructions stored thereon and one or more processors configured to be capable of executing the stored programmed instructions to:
generate metadata comprising state information for a received network packet, wherein the state information includes data associated with a session history of the received network packet;
insert the generated metadata into an additional network packet, wherein the additional network packet is created for the received network packet;
send the received network packet to a destination device without including the generated metadata and without performing a network diagnostic operation on the received network packet; and perform the network diagnostic operation only on the additional network packet.

17. The network traffic management system of claim 16, wherein the one or more processors are further configured to be capable of executing the programmed instructions stored in the memory to:
add the additional network packet to a series of cloned plurality of network packets, and
perform the network diagnostic operation on the series of cloned plurality of network packets.

18. The network traffic management system of claim 17, wherein the additional network packet is a pseudo packet with no payload data in a payload field.

19. The network traffic management system of claim 16, wherein the additional network packet is created when the state information for the received network packet is changed.

20. The network traffic management system of claim 16 wherein the one or more processors are further configured to be capable of executing the programmed instructions stored in the memory to store the additional network packet comprising the generated metadata in memory as a reference when analyzing network traffic.

* * * * *